US007497298B2

(12) United States Patent
Shearer et al.

(10) Patent No.: US 7,497,298 B2
(45) Date of Patent: Mar. 3, 2009

(54) MACHINE JOYSTICK CONTROL SYSTEM

(75) Inventors: Daniel Edward Shearer, Metamora, IL (US); Craig B. Kelley, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 517 days.

(21) Appl. No.: 10/872,431

(22) Filed: Jun. 22, 2004

(65) Prior Publication Data

US 2005/0279561 A1 Dec. 22, 2005

(51) Int. Cl.
*B60K 26/00* (2006.01)

(52) U.S. Cl. ...................................................... 180/333

(58) Field of Classification Search ................. 180/333; 74/471 XY

See application file for complete search history.

(56) References Cited

U.S. PATENT DOCUMENTS 3,580,636 A 5/1971 Setto
4,055,230 A 10/1977 Kestian et al.
4,140,200 A 2/1979 Tucek
4,200,166 A 4/1980 Hansen
4,392,546 A 7/1983 Brown et al.
4,476,954 A 10/1984 Johnson et al.
4,478,308 A 10/1984 Klaassen
4,699,239 A 10/1987 Ishino et al.
4,702,520 A 10/1987 Whisler et al.
4,895,039 A 1/1990 Hegg
4,895,040 A 1/1990 Soederberg
4,914,976 A 4/1990 Wyllie
5,042,314 A 8/1991 Rytter et al.
D323,279 S 1/1992 Soederberg
5,086,870 A 2/1992 Bolduc
5,244,066 A 9/1993 Mackoway et al.
5,286,078 A 2/1994 Mottino et al.
5,379,663 A 1/1995 Hara
5,448,028 A 9/1995 Filion et al.
5,520,258 A 5/1996 Kemshall
5,566,778 A 10/1996 Valier et al.
5,584,346 A 12/1996 Sakamoto et al.
5,924,515 A 7/1999 Stauffer
5,938,282 A 8/1999 Epple
5,960,903 A 10/1999 Abels et al.
H1831 H 2/2000 Kelley et al.
H1840 H 2/2000 Carew et al.
6,039,141 A 3/2000 Denny
6,061,617 A 5/2000 Berger et al.
6,065,365 A 5/2000 Ostler et al.
H1851 H 6/2000 Kelley et al.
D427,207 S 6/2000 Altmann et al.
D429,246 S 8/2000 Holma
6,140,787 A * 10/2000 Lokhorst et al. ....... 318/568.18

(Continued)

*Primary Examiner*—Faye M. Fleming
(74) *Attorney, Agent, or Firm*—Finnegan, Henderson, Farabow, Garrett & Dunner

(57) ABSTRACT

A control system for a work machine, having an articulated joint and a work implement with at least one axis of rotation, has a first lever with a first longitudinal axis. A twist angle of the first lever about the first longitudinal axis is related to an articulation speed of the work machine. The control system also has a second lever having a second longitudinal axis. A twist angle of the second lever about the second longitudinal axis is related to a rotation speed of the work implement about the at least one axis of rotation. A plurality of operator control devices are disposed on the first and second levers.

40 Claims, 4 Drawing Sheets

U.S. PATENT DOCUMENTS

| | | | |
|---|---|---|---|
| 6,152,239 | A | 11/2000 | Kelley et al. |
| 6,164,285 | A | 12/2000 | Garberg et al. |
| 6,276,749 | B1 | 8/2001 | Okazawa et al. |
| D463,459 | S | 9/2002 | Tamaru et al. |
| 6,523,617 | B2 | 2/2003 | McGugan |
| 6,536,825 | B2 | 3/2003 | McAndrew et al. |
| 6,550,562 | B2 | 4/2003 | Brandt et al. |
| 6,634,453 | B2 | 10/2003 | Arthur et al. |
| 6,843,681 | B2 | 1/2005 | Sanner |
| 6,948,582 | B2 | 9/2005 | Shiomi et al. |
| 7,178,623 | B2 | 2/2007 | Ginzel et al. |
| 2002/0166267 | A1 | 11/2002 | McGugan |
| 2003/0188912 | A1 | 10/2003 | Amamiya |
| 2005/0072619 | A1 | 4/2005 | Amamiya et al. |

* cited by examiner

MACHINE JOYSTICK CONTROL SYSTEM

TECHNICAL FIELD

The present disclosure is directed to a control system for a work machine and, more particularly, to a joystick control system for a work machine.

BACKGROUND

Work machines such as, for example, motor graders, backhoe loaders, agricultural tractors, wheel loaders, skid-steer loaders, and other types of heavy machinery are used for a variety of tasks requiring operator control of the work machine and various work implements associated with the work machine. These work machines and work implements can be relatively complicated and difficult to operate. They may have an operator interface with numerous controls for steering, position, orientation, transmission gear ratio, and travel speed of the work machine, as well as position, orientation, depth, width, and angle of the work implement.

Historically, work machines have incorporated single-axis lever control mechanisms with complex mechanical linkages and multiple operating joints, or a plurality of cables to provide the desired functionality. Such control mechanisms require operators with high skill levels to control the many input devices. After a period of operating these control mechanisms, the operators may become fatigued. In addition, because an operator's hand may be required to travel from one actuating element to another, an operator's delayed reaction time and the complexity and counter-intuitiveness of the controls may result in poor quality and/or low production.

An operator interface may include a joystick control system designed to reduce operator fatigue, improve response time of the operator, and improve results of the work machine. For example, U.S. Pat. No. 5,042,314 (the '314 patent) issued to Rytter et al. on Aug. 27, 1991, describes a steering and transmission shifting control mechanism that includes a transversally rockable control handle. The steering and transmission shifting control mechanism also includes a steering actuator element connected at the bottom of the control handle to depress either a left or right actuating plunger of a hydraulic pilot valve assembly for effecting steering. The steering and transmission shifting control mechanism further includes an electrical switch activating element to change the speed of a multi-speed transmission through an associated electronic control system.

Although the steering and transmission shifting control mechanism of the '314 patent may alleviate some of the problems associated with separate work machine controls for effecting steering and transmission operations, the steering and transmission shifting control mechanism may not control enough of the features and/or functions of the work machine and work implement to reduce operator fatigue and improve the quality and/or production of the work machine. An operator may still be required to operate multiple control devices to effect articulation, wheel tilt, work implement position and orientation control, throttle control, alignment control, differential control, and other work machine and implement functions and features. In addition, the steering and transmission operations of the steering and transmission shifting control mechanism of the '314 patent may still require operator input that is complex or counter-intuitive.

The disclosed control system is directed towards overcoming one or more of the problems as set forth above.

SUMMARY OF THE INVENTION

A control system for a work machine having an articulated joint and a work implement with at least one axis of rotation, includes a first lever with a first longitudinal axis. A twist angle of the first lever about the first longitudinal axis is related to an articulation speed of the work machine. The control system also includes a second lever having a second longitudinal axis of rotation. A twist angle of the second lever about the second longitudinal axis is related to a rotation speed of the work implement about the at least one axis. A plurality of operator control devices are disposed on the first and second levers.

A method of controlling a work machine includes twisting a first lever through a first twist angle in one of a clockwise and counterclockwise direction to cause an articulation of an articulated joint of a work machine, such that a portion of the work machine rotates about the articulated joint in the one of the clockwise and counterclockwise directions at an articulation speed related to the first twist angle. The method further includes twisting a second lever through a second twist angle in one of a clockwise and counterclockwise direction to cause a rotation of a work implement about a first axis in the same one of a clockwise and counterclockwise direction and at a rotation speed related to the second twist angle. A plurality of operator control devices are disposed on the first and second levers.

DETAILED DESCRIPTION

Figure 1:
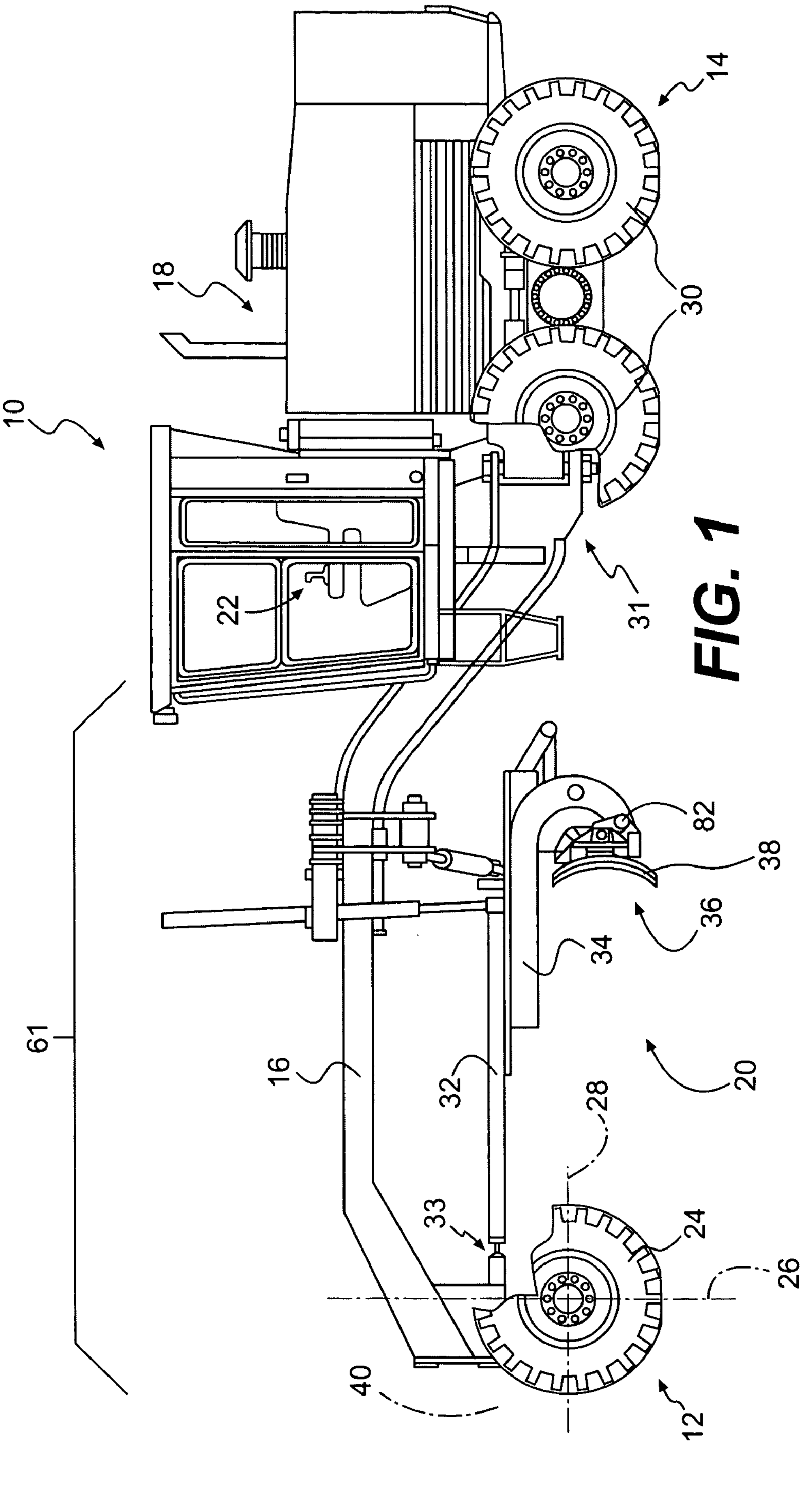
FIG. 1 illustrates a pictorial representation of a work machine according to an exemplary embodiment.

An exemplary embodiment of a work machine 10 is illustrated in FIG. 1. Work machine 10 may be a motor grader, a backhoe loader, an agricultural tractor, a wheel loader, a skid-steer loader, or any other type of work machine known in the art. Work machine 10 may include a steerable traction device 12, a driven traction device 14, a frame 16 connecting steerable traction device 12 to driven traction device 14, a power source 18 supported by driven traction device 14, and a transmission (not shown) configured to transmit power from power source 18 to driven traction device 14. Work machine 10 may also include a work implement such as, for example, a drawbar-circle-moldboard assembly (DCM) 20, and a control system 22.

Steerable traction device 12 may include one or more wheels 24 located on each side of work machine 10 (only one side shown). Alternately, steerable traction device 12 may include tracks, belts, or other traction devices. Wheels 24 may be rotatable about a vertical axis 26 for use during steering. Wheels 24 may also be tiltable about a horizontal axis 28 to oppose a reaction force caused by DCM 20 engaging a work surface, or to adjust a height of DCM 20. Steerable traction device 12 may or may not be driven.

Driven traction device 14 may include wheels 30 located on each side of work machine 10 (only one side shown). Alternately, driven traction device 14 may include tracks, belts or other traction devices. Driven traction device 14 may include a differential gear assembly (not shown) configured to divide power from power source 18 between wheels 30 located on either side of work machine 10. The differential gear assembly may allow wheels 30 on one side of work machine 10 to turn faster than wheels 30 located on an opposite side of work machine 10. The differential gear assembly may also include a lock feature that will be described in more detail below. Driven traction device 14 may or may not be steerable.

Frame 16 may connect steerable traction device 12 to driven traction device 14. Frame 16 may include an articulated joint 31 that connects driven traction device 14 to frame 16. Work machine 10 may be caused to articulate steerable traction device 12 relative to driven traction device 14 via articulated joint 31. Work machine 10 may also include a neutral articulation feature that, when activated, causes automatic realignment of steerable traction device 12 relative to driven traction device 14 to cause articulation joint 31 to return to a neutral articulation position.

Power source 18 may be an engine such as, for example, a diesel engine, a gasoline engine, a natural gas engine, or any other engine known in the art. Power source 18 may also be another source of power such as a fuel cell, a power storage device, or another source of power known in the art.

The transmission may be an electric transmission, a hydraulic transmission, a mechanical transmission, or any other transmission known in the art. The transmission may be operable to produce multiple output speed ratios and may be configured to transfer power from power source 18 to driven traction device 14 at a range of output speeds.

DCM 20 may include a drawbar assembly 32 supported by a center portion of frame 16 via a hydraulic ram assembly, and connected to a front portion of frame 16 via a ball and socket joint 33. A circle assembly 34 may be connected to drawbar assembly 32 via additional hydraulic rams and may be configured to support a moldboard assembly 36 having a blade 38. DCM 20 may be both vertically and horizontally positioned relative to frame 16. DCM 20 may also be controlled to rotate circle assembly 34 and moldboard assembly 36 relative to drawbar assembly 32. Blade 38 may be positioned both horizontally and vertically, and oriented relative to circle assembly 34. It is contemplated that DCM 20 may be absent and replaced with another work implement such as, for example, a ripper, a bucket, or another work implement known in the art.

Figure 2A:
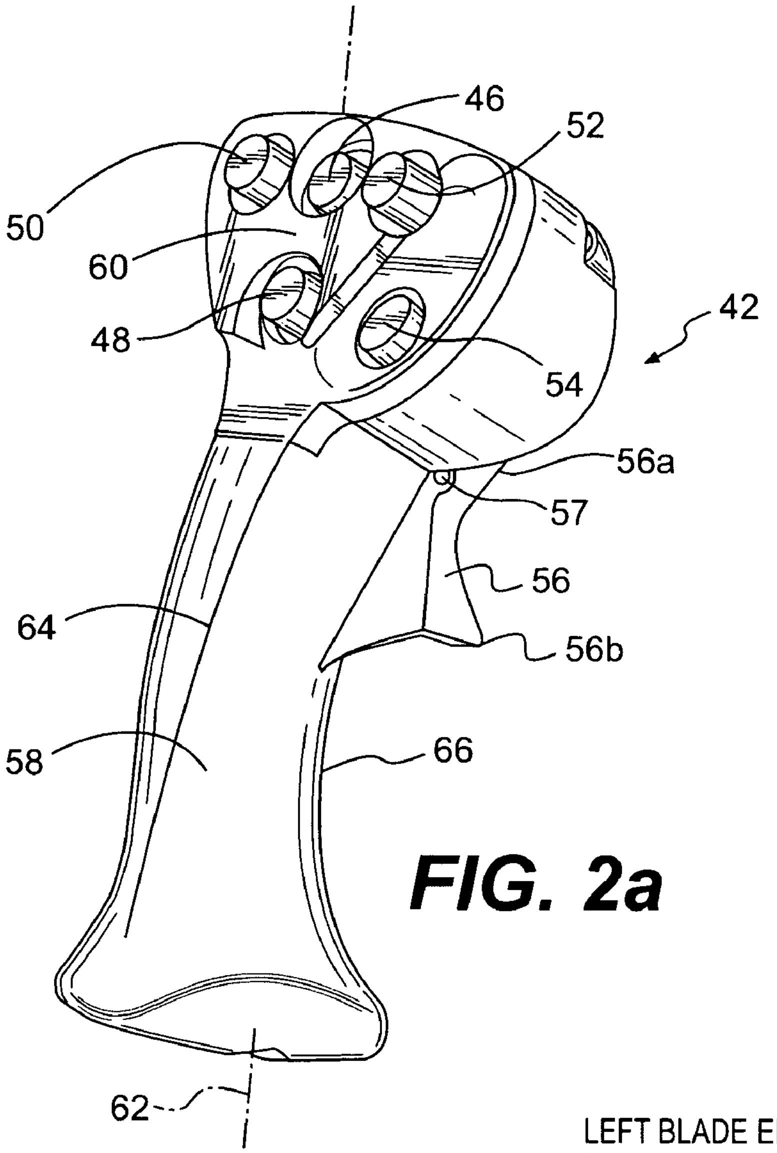
FIG. 2*a* illustrates a diagrammatic perspective view of a joystick controller according to an exemplary embodiment.
Figure 3A:
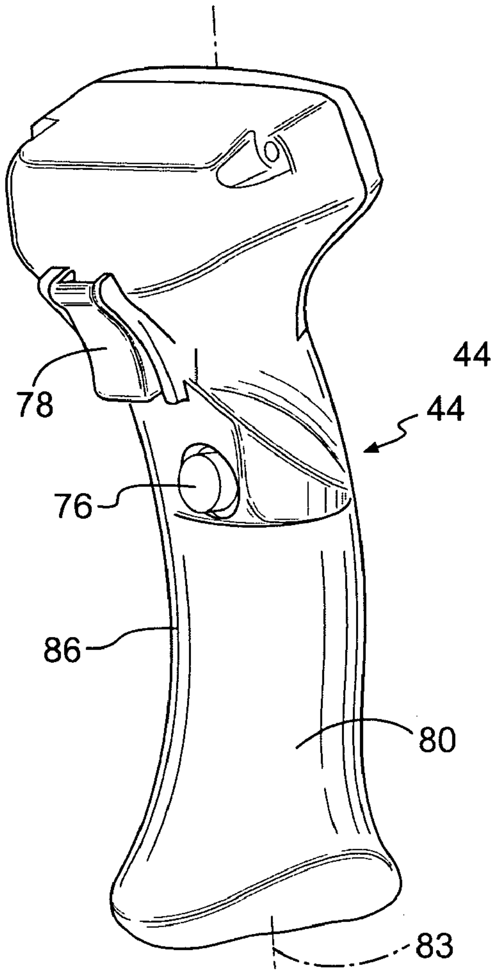
FIG. 3*a* illustrates a diagrammatic perspective view of a joystick controller according to an exemplary embodiment.
Figure 3B:
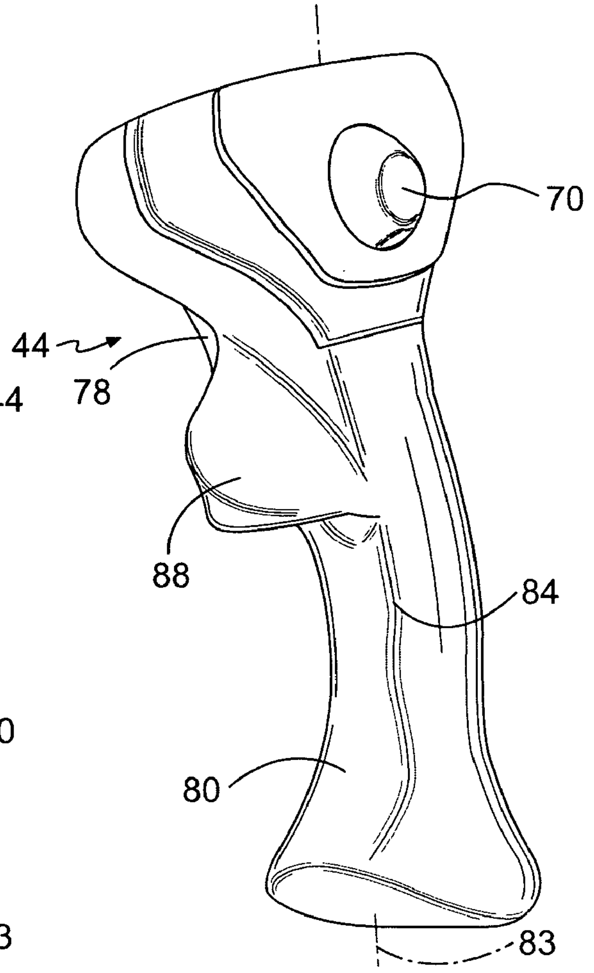
FIG. 3*b* illustrates another diagrammatic perspective view of the joystick controller of FIG. 3*a* according to an exemplary embodiment.

As illustrated in FIGS. 2*a*, 3*a*, and 3*b*, control system 22 may include a left joystick controller 42 and a right joystick controller 44 located on either side of an operator station, respectively. Left and right joystick controllers 42 and 44 may be configured to position and/or orient work machine 10 and components of DCM 20. Left and right joystick controllers 42, 44 may also be used to actuate various functions and/or features of work machine 10.

FIG. 2*a* illustrates left joystick controller 42 having a plurality of buttons 46, 48, 50, 52, 54 and a trigger 56 disposed on a lever 58. Various functions of work machine 10 and DCM 20 may be actuated in different manners according to the condition and/or position of buttons 46, 48, 50, 52, and 54, the position of trigger 56, and the position and orientation of lever 58.

For example, buttons 46 and 48 may cause the transmission output speed ratio to change. Button 46 may cause the transmission to shift to a higher output speed ratio. Button 48 may cause the transmission to shift to a lower output speed ratio. Transmission ratio shifting buttons 46 and 48 may be recessed within lever 58, with a ridge 60 separating buttons 46 and 48 from each other. As an operator attempts to press one of buttons 46 or 48, ridge 60 forces an operator's finger towards one or the other of buttons 46 or 48. Ridge 60 may block depressive movement of an operator's finger in the area between buttons 46 and 48. In this manner, an operator may be impeded from inadvertently pressing both button 46 and button 48 simultaneously.

Buttons 50 and 52 may cause wheels 24 to lean or tilt relative to a tilt plane through horizontal axis 28. Button 50 may cause wheels 24 to tilt to the left relative to an operator's perspective, while button 52 may cause wheels 24 to tilt to the right. The tilt speed of wheels 24 caused by buttons 50 and 52 may correspond to the engagement positions of the respective buttons. For example, buttons 50 and 52 may have a maximum position corresponding to a maximum tilt speed and a minimum position corresponding to a minimum tilt speed (e.g., tilt speed of zero magnitude). Buttons 50 and 52 may be placed at any position between the maximum and minimum positions to tilt wheels 24 at a corresponding speed between the maximum and minimum tilt speeds. In this manner, motion of buttons 50 and 52 may be related (i.e., proportional) to movement speed of the associated components controlled by the buttons. After depressing either of buttons 50 and 52 to set a tilt speed of wheels 24, wheels 24 may continue to tilt at the same tilt speed until a position of either button 50 or 52 is changed or an end tilt position of wheels 24 is attained.

Button 54 may be a neutral articulation button configured to move steerable traction device 12 back into alignment with driven traction device 14, via articulated joint 31, after an articulated operation. When enabled, this neutral alignment feature may provide automatic alignment of steerable device 12 and driven traction device 14 without an operator needing to rely upon instrumentation or visual observation.

Trigger 56 may be configured to control a transmission condition when actuated. Trigger 56 may be a three-way rocker switch that toggles between a forward, neutral, and reverse output direction of the transmission. Trigger 56 may have an upper portion 56*a* and a lower portion 56*b* configured to pivot about pivot point 57. When starting in the neutral condition, the reverse condition may be selected by pulling upper portion 56*a* a first distance, thereby causing the transmission to operate in a first output rotational direction. Pulling lower portion 56*b* the first distance returns the transmission condition to neutral. Pulling lower portion 56*b* a second distance selects the forward condition, thereby causing the transmission output rotation to rotate in a second direction opposite the first direction. Pulling upper portion 56*a* the second distance returns the transmission condition to neutral.

Figure 2B:
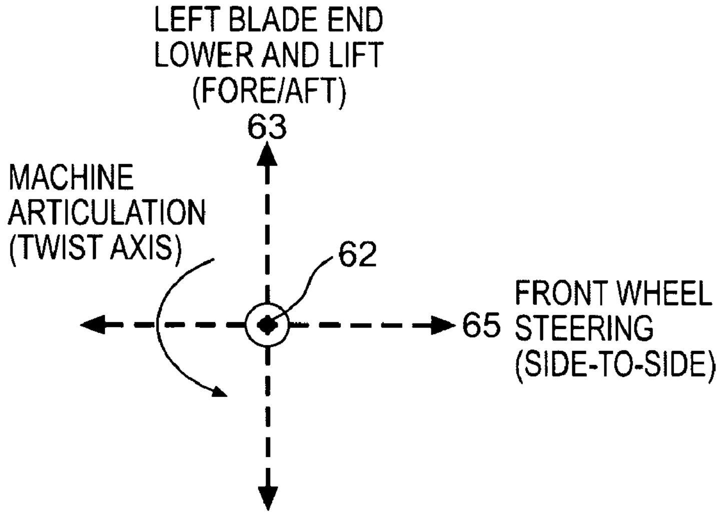
FIG. 2*b* illustrates a top view schematic of the operation of the joystick controller of FIG. 2*a;*

As shown in the top view illustration of FIG. 2*b*, twisting lever 58 about a longitudinal axis 62 may cause work machine 10 to articulate. A twist of lever 58 in a clockwise manner may cause a forward portion 61 of work machine 10, which includes steerable traction device 12, to articulate in a clockwise direction about articulation joint 31 joining frame 16 (to which steerable traction device 14 is connected) and driven traction device 14. Similarly, a twist of lever 58 in a counter-clockwise manner may cause forward portion 61 to articulate in a counter-clockwise direction about articulation joint 31 joining frame 16 and driven traction device 14.

Tilting lever 58 fore and aft about axis 65, may cause blade 38 to move. Tilting lever 58 in a fore direction about axis 65 may cause a left end (relative to an operator's perspective) of blade 38 to lower, while tilting lever 58 in an aft direction about axis 65 may cause the left end of blade 38 to lift.

The magnitude of the lever tilt angle away from axis 62 in the fore/aft direction, along axis 63, may relate to a speed of blade movement. As the tilt angle of lever 58 away from longitudinal axis 62, about axis 65, approaches a maximum position, the movement speed of blade 38 in the associated direction approaches a maximum rate. In this manner, motion of lever 58 may be related (e.g., proportional) to movement speed of blade 38.

Tilting lever 58 side-to-side away from longitudinal axis 62, about axis 63, may cause the angle of wheels 24 to rotate about vertical axis 26 to steer work machine 10. Tilting lever 58 in a left direction about axis 62 may cause wheels 24 to rotate in a counter clockwise direction, as viewed from an operator's perspective. Similarly, tilting lever 58 in a right direction about axis 62 may cause wheels 24 to rotate in a clockwise direction.

The magnitude of the lever tilt angle away from axis 62, along axis 65, in the side-to-side direction may be related to the rotation angle of wheels 24. As the tilt angle of lever 58 away from longitudinal axis 62, along axis 65, approaches a maximum position, the rotation angle of wheels 24 in the associated direction approaches a maximum value. In this manner, motion of lever 58 is related (i.e., proportional) to steering angle.

Lever 58 may include an operator interface having ridges corresponding to joints of an operator's hands. A first ridge 64 may correspond to a joint between a thumb and a palm, while a second ridge 66 may correspond to a joint in the fingers of the operator's hand. Ridges 64 and 66 may improve operator comfort by providing positive placement of an operator's hand on lever 58.

FIGS. 3*a* and 3*b* illustrate right joystick controller 44 of control system 22. Right joystick controller 44 may include a four-way rocker switch 70 and a trigger 78 disposed on a lever 80. Various functions of work machine 10 and DCM 20 may be actuated in different manners according to the engagement position of rocker switch 70, the position of trigger 78, and the orientation of lever 80.

For example, actuation of rocker switch 70 in left and right directions (relative to an operator's perspective) may cause the entire DCM 20 to shift from side-to-side. Rocking rocker switch 70 to the left may cause DCM 20 to shift left. Rocking rocker switch 70 to the right may cause DCM 20 to shift right. Rocker switch 70 may also cause blade 38 to rotate or tip about a pivot axis 82. Rocking rocker switch 70 forward may cause the top of blade 38 to tip forward towards a work surface. Rocking rocker switch 70 aft may cause the top of blade 38 to tip backwards, bringing the bottom of blade 38 upwards and away from the work surface.

The speed of side-to-side movement of DCM 20 and/or rotation of blade 38 about pivot axis 82 caused by movement of rocker switch 70 may be related to an engagement position of rocker switch 70 in the respective direction. Rocker switch 70 may have maximum rock positions corresponding to maximum shift speeds of DCM 20 in left and right directions or maximum rotation speeds of blade 38. Rocker switch 70 may also have minimum rock positions corresponding to minimum shift speeds of DCM 20 or minimum rotation speeds of blade 38. Rocker switch 70 may be rocked to any position between the maximum and minimum depressed positions to shift DCM 20 or rotate blade 38 at corresponding minimum and maximum speeds in the associated direction. In this manner, motion of rocker switch 70 may be related (i.e., proportional) to movement speed of the associated components controlled by rocker switch 70. After rocking rocker switch 70 in the left, right, fore, or aft directions to set either a movement speed of DCM 20 or a rotation speed of blade 38, DCM 20 or blade 38 may continue to move or rotate at the same speed until rocker switch 70 is rocked to a new position. In addition, rocker switch 70 may be utilized to cause movement of DCM 20 and rotation of blade 38 simultaneously. In particular, rocker switch 70 may be rocked towards a fore/right direction, a fore/left direction, an aft/left direction, an aft/right direction, or to any position therebetween, thereby causing simultaneous movement of DCM 20 and rotation of blade 38 in the associated directions.

Button 76 may enable and disable the differential lock feature to lock and unlock the speed of wheels 30 located on one side of work machine 10 with wheels 30 located on the other side of work machine 10. When enabled, this feature may provide substantially uniform or equal speed to each of wheels 30 of driven traction device 14, thereby providing additional traction to the work surface when required.

Trigger 78 may be configured to control a throttle feature when actuated. During operation of work machine 10, there may be times when the speed of power source 18 controllably deviates from a predetermined position in order to accomplish a particular function. Engaging trigger 78 may cause the throttle to return to the predetermined position. For example, an operator may set a desired throttle position. During particular functions such as for example, turning, lifting, idling, and other functions known in the art, the throttle may be caused to deviate from the desired throttle position set by the operator to properly accomplish these functions. Upon completion of the particular function, the operator may engage trigger 78 to cause the throttle to return to the desired position previously set by the operator.

Figure 3C:
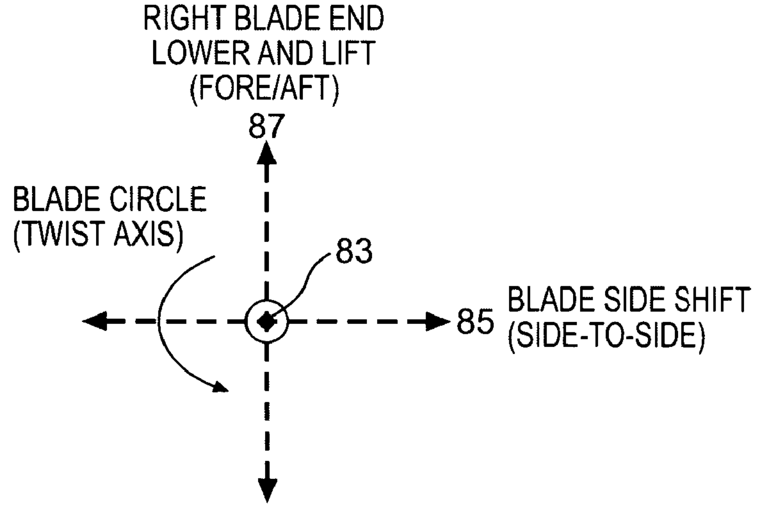
FIG. 3*c* illustrates a schematic of the operation of the joystick controller of FIGS. 3*a* and 3*b* according to an exemplary embodiment.

As shown in the top-view illustration of FIG. 3*c*, twisting lever 80 about a longitudinal axis 83 may cause circle assembly 34 to rotate relative to drawbar assembly 32. A twist of lever 80 in a clockwise manner may cause circle assembly 34 to rotate in a clockwise manner, as viewed from an operator's perspective. Similarly, a twist of lever 80 in a counter-clockwise manner may cause circle assembly 34 to rotate in a counter-clockwise manner.

Tilting lever 80 side-to-side away from longitudinal axis 83, about axis 87, may cause blade 38 to shift in the same direction as the tilt of lever 80. Tilting lever 80 in a left direction about axis 87 may cause blade 38 to shift in a left direction, as viewed from an operator's perspective. Similarly, tilting lever 80 in a right direction about axis 87 may cause blade 38 to shift in a right direction as viewed from an operator's perspective.

The magnitude of the lever tilt angle away from axis 83 in the side-to-side direction may relate to the speed of movement of blade 38 in the same direction. As the tilt angle of lever 80 away from longitudinal axis 83 approaches a maximum position about axis 87, the movement speed of blade 38 in the associated direction approaches a maximum value.

Tilting lever 80 in a fore/aft direction away from longitudinal axis 83, about axis 85, may cause blade 38 to move in a vertical direction, as viewed from an operator's perspective. Tilting lever 80 in a fore direction about axis 85 may cause a right end of blade 38 to lower towards the work surface, as viewed from an operator's perspective. Similarly, tilting lever 80 in an aft direction about axis 85 may cause the right end of blade 38 to lift away from the work surface, as viewed from an operator's perspective.

The magnitude of the lever tilt angle away from axis 83 in the side-to-side direction may relate to the magnitude of the movement speed of the right end of blade 38. As the tilt angle of lever 80 away from longitudinal axis 83 approaches a maximum position about axis 85, the movement speed of the right end of blade 38 in the associated direction approaches a maximum value.

Similar to lever 58, lever 80 may include an operator's hand interface having ridges corresponding to joints of an operator's hands. A first ridge 84 may correspond to a joint between a thumb and a palm, while a second ridge 86 may correspond to a joint in the fingers of the operator's hand. Ridges 84 and 86 may improve operator comfort by providing positive placement of an operator's hand on lever 58.

Lever 80 may also include a guard 88, located on one side of lever 80, proximal to button 76. Guard 88 may reduce the risk of inadvertently or accidentally pressing differential lock button 76.

Figure 4:
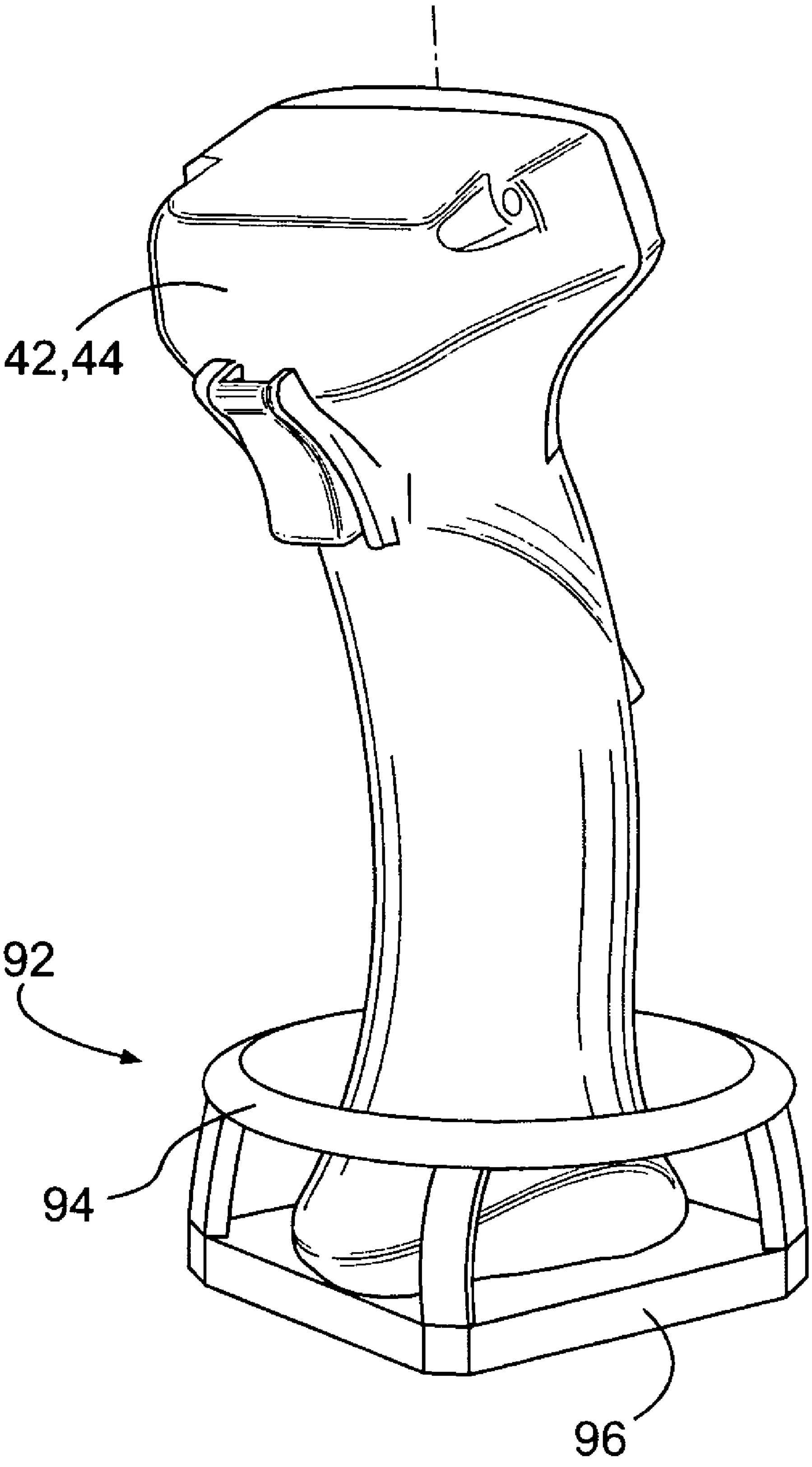
FIG. 4 illustrates a diagrammatic perspective view of a joystick controller having a hand stabilizer according to an exemplary embodiment.

FIG. 4 illustrates a hand stabilizer 92 for use with left and/or right joystick controllers 42, 44. Hand stabilizer 92 may include a ring 94 connected to a base 96. Base 96 may be proximally disposed to one end of respective levers 58 and/or 80. Ring 94 may be configured to support an operator's hand. It is contemplated that hand stabilizer 92 may be combined as a single unit with an operator armrest or the respective joystick controller. It is further contemplated that a support device other than a ring may be connected to base 96 such as, for example, a friction plate that substantially surrounds left and/or right joystick controllers 42, 44.

During manipulation of left and/or right joystick controllers 42 and 44, an operator may use hand stabilizer 92 to offset the resistive force caused by movement of left and/or right joystick controllers 42 and 44. An operator may apply pressure to a portion of ring 94, forward of the respective joystick controller, in a rearward direction during tilting of the associated lever in a forward direction. Similarly, when tilting the associated lever rearward, or side-to-side, an operator may apply pressure to ring 94 opposite the direction of the tilt so as to resist the force resulting from the hand pushing or pulling the associated lever in that direction.

INDUSTRIAL APPLICABILITY

Control system 22 having left and right joystick controllers 42, 44 may be applicable to any work machine requiring multiple operator control inputs to position and/or orient the work machine or work tool, or to control a work machine function. Control system 22 may effectively reduce operator fatigue by providing oft-used actuators within very close proximity to each other and on common controllers. Locating the oft-used actuators on common controllers allows the operator to control different machine functions without moving between different controllers.

In addition, because the actuating motion of the buttons, triggers, and/or levers associated with control system 22 may relate to corresponding work machine or work implement motion, the operation of these control devices is intuitive. The intuitiveness of the control devices may allow for improved quality and production of work machine 10 as well as the operation of work machine 10 by an operator with a lower skill level.

Other embodiments will be apparent to those skilled in the art from consideration of the specification and practice of the disclosed embodiments. For example, many different features and/or functions of work machine 10 may be controlled by left and right joystick controllers 42 and 44. Those functions and/or features described as being controlled by left joystick controller 42 may alternately be controlled by right joystick controller 44, and vice versa. Additional or fewer features and/or functions may be controlled by left and right joystick controllers 42 and 44. The features and/or functions may be controlled by various operator control devices, other than buttons and triggers, located on first and second levers 58 and 80 such as, for example, switches, push/pull devices, levers, disk adjusters, and other operator control devices known in the art. In addition, those functions and/or features described as being controlled by buttons or rocker switches could also be controlled by lever manipulation, and vice versa. Further, those buttons, rocker switches, triggers, and/or levers described as causing motion or speed of an associated component proportional to the position of the buttons, rocker switches, triggers, and/or levers, may alternately be on/off-type control devices, wherein motion of the affected component is continuous or step-wise while the button, trigger, and/or lever is in an engaged position. It is intended that the specification and examples be considered as exemplary only, with a true scope of the invention being indicated by the following claims.

What is claimed is:

1. A control system for a machine having an implement with at least one axis of rotation, the control system comprising:

- a first lever having a first longitudinal axis, wherein a twist angle of the first lever about the first longitudinal axis is related to an articulation speed of an articulated joint of the machine;
- a second lever having a second longitudinal axis, wherein a twist angle of the second lever about the second longitudinal axis is related to a rotational speed of the implement about the at least one axis of rotation; and
- a plurality of operator control devices disposed on the first and second levers.

2. The control system of claim 1, wherein at least one of the first lever and the second lever is configured to tilt about at least one tilt axis, a steering direction of the machine being related to a tilt angle of the at least one of the first lever and the second lever about the at least one tilt axis.

3. The control system of claim 1, wherein the machine includes a steerable traction device configured to tilt with respect to a tilt plane, and a tilt speed of the steerable traction device relative to the tilt plane is related to an engagement position of at least one of the plurality of operator control devices.

4. The control system of claim 1, wherein at least one of the plurality of operator control devices is configured to place the articulated joint in a neutral articulation position.

5. The control system of claim 1, wherein the machine includes a plurality of driven traction devices and a differential gear mechanism that allows the plurality of driven traction devices to rotate at different speeds relative to each other, and at least one of the plurality of operator control devices is configured to selectively lock the differential gear mechanism and to cause the plurality of driven traction devices to rotate at a substantially uniform speed.

6. The control system of claim 1, wherein at least one of the first and second levers has an operator hand interface including:

- a forward portion having a first longitudinal ridge corresponding to a joint of an operator's fingers; and an aft portion having a second longitudinal ridge corresponding to a joint between a thumb and palm of an operator's hand.

7. The control system of claim 1, further including at least one guard disposed on at least one of the first and second levers and configured to impede movement of an operator's hand towards at least one of the plurality of operator control devices.

8. The control system of claim 1, wherein the control system further includes a hand stabilizer proximally disposed to an end of at least one of the first and second levers, the hand stabilizer configured to provide leverage to an operator's hand during manipulation of the at least one of the first and second levers.

9. The control system of claim 1, wherein the implement includes a second axis of rotation, and an orientation speed of the implement with respect to the second axis of rotation is related to a position of at least one of the plurality of operator control devices.

10. The control system of claim 1, wherein an articulation direction of a forward portion of the machine about an articulation joint is in the same direction as a twist direction of the first lever, and a rotation direction of the implement about the at least one axis of rotation is in the same direction as the twist direction of the second lever.

11. The control system of claim 1, wherein at least one of the first lever and the second lever is configured to tilt about at least one tilt axis, and a linear movement of at least a portion of the implement in a first direction is related to a tilt direction of the at least one of the first lever and the second lever about the at least one tilt axis.

12. The control system of claim 11, wherein the at least one of the first lever and the second lever is configured to tilt about a second tilt axis generally orthogonal to the first tilt axis wherein a linear movement of the implement in a second direction, generally orthogonal to the first direction, is related to a tilt direction of the at least one of the first and second levers about the second tilt axis.

13. The control system of claim 11, wherein a movement speed of the implement in a second direction, generally orthogonal to the first direction, is related to an engagement position of at least one of the plurality of operator control devices.

14. The control system of claim 1, wherein the machine includes a transmission having a range of output speed ratios selectable by at least one of the plurality of operator control devices.

15. The control system of claim 14, wherein at least one of the plurality of operator control devices is a three-way control device configured to toggle between a forward, reverse, and neutral condition of the transmission.

16. The control system of claim 1, wherein a first and a second of the plurality of operator control devices are recessed into one of the first and second levers, with a ridge separating the first and second of the plurality of operator control devices.

17. The control system of claim 1, wherein at least one of the plurality of control devices is configured to engage a throttle feature of the machine.

18. The control system of claim 17, wherein the throttle feature causes the throttle to move to a predetermined throttle position in response to the at least one of the plurality of control devices being moved to an engaged position.

19. The control system of claim 1, further including at least one four-way control device configured for movement in a first direction to cause a first implement movement and for movement in a second direction orthogonal to the first to cause a second implement movement.

20. The control system of claim 19, wherein the at least one four-way control device may be moved in a direction between the first and second directions to simultaneously cause both the first implement movement and the second implement movement.

21. A machine comprising:

a steerable traction device;

a driven traction device;

a frame having an articulated joint for articulately connecting the steerable traction device to the driven traction device;

a power source supported by at least one of the frame and the driven traction device;

a transmission operatively connected to the power source and configured to transmit power from the power source to the driven traction device, the transmission having a range of output speed ratios;

an implement operatively connected to the frame and having at least one axis of rotation; and a control system comprising:

a first lever having a first longitudinal axis, wherein a twist angle of the first lever about the first longitudinal axis is related to an articulation speed of the machine;

a second lever having a second longitudinal axis, wherein:

a twist angle of the second lever about the second longitudinal axis is related to a rotational speed of the implement about the at least one axis, at least one of the first lever and the second lever being configured to tilt about at least one tilt axis, and a steering direction of the machine is related to a tilt angle of the at least one of the first lever and the second lever about the at least one tilt axis;

a plurality of operator control devices disposed on the first and second levers, wherein:

the machine includes a steerable traction device configured to tilt with respect to a tilt a plane, a tilt speed of the steerable traction device relative to the tilt plane relating to an engagement position of at least one of the plurality of operator control devices, an output speed ratio of the transmission is selectable by at least one of the plurality of operator control devices, at least one of the plurality of operator control devices is configured to place the articulated joint in a neutral articulation position, the machine includes a plurality of driven traction devices and a differential gear mechanism that allows the plurality of driven traction devices to rotate at different speeds relative to each other, and at least one of the plurality of operator control devices is configured to selectively lock the differential gear mechanism and to cause the plurality of driven traction devices to rotate at a substantially uniform speed, and one of the plurality of operator control devices is configured to engage a throttle feature of the machine; and at least one four-way control device configured for movement in a first direction to cause a first implement movement and for movement in a second direction orthogonal to the first direction to cause a second implement movement.

22. The machine of claim 21, wherein the implement includes a second axis of rotation, and an engagement position of at least one of the plurality of operator control devices is related to an orientation speed of the implement with respect to the second axis of rotation.

23. The machine of claim 21, wherein an articulation direction of a forward portion of the machine about an articulation joint is in the same direction as a twist direction of the first lever and a rotation direction of the implement about the at least one axis of rotation is in the same direction as the twist direction of the second lever.

24. The machine of claim 21, wherein at least one of the first lever and the second lever is configured to tilt about at least one tilt axis, and a linear movement of at least a portion of the implement in a first direction is related to a tilt direction of the at least one of the first lever and the second lever about the at least one tilt axis.

25. The machine of claim 24, wherein the at least one of the first lever and the second lever is configured to tilt about a second tilt axis generally orthogonal to the at least one tilt axis, and a linear movement of the implement in a second direction, generally orthogonal to the first direction, is related to a tilt direction of the at least one of the first and second levers about the second tilt axis.

26. The machine of claim 24, wherein a movement speed of the implement in a second direction, generally orthogonal to the first direction, is related to a position of at least one of the plurality of operator control devices.

27. The machine of claim 21, wherein one of the plurality of operator control devices includes a three-way control device configured to toggle between a forward, reverse, and neutral condition of the transmission.

28. The machine of claim 21, wherein the at least one four-way control device may be moved in a direction between the first and second directions to simultaneously cause both the first implement movement and the second implement movement.

29. A method of controlling a machine, comprising:

twisting a first lever through a first twist angle in one of a clockwise and counterclockwise direction to cause an articulation of an articulated joint of a machine such that a portion of the machine rotates about the articulated joint in the one of a clockwise and counterclockwise direction and at an articulation speed related to the first twist angle; and twisting a second lever through a second twist angle in one of a clockwise and counterclockwise direction to cause a rotation of a implement about a first axis in the same one of a clockwise and counterclockwise direction and at a rotation speed related to the second twist angle, wherein a plurality of operator control devices are disposed on the first and second levers.

30. The method of claim 29, further including tilting at least one of the first and second levers at a tilt angle about at least one tilt axis to steer a steerable traction device in a direction related to the tilting direction and by an amount related to the tilt angle.

31. The method of claim 29, further including manipulating at least one of the plurality of operator control devices to tilt a steerable traction device at an angle relative to a tilt plane, a tilt speed relative to the tilt plane corresponding to a position of the at least one of the plurality of operator control devices.

32. The method of claim 29, further including manipulating at least one of the plurality of operator control devices to place an articulation joint of the machine in a neutral articulation position.

33. The method of claim 29, further including manipulating at least one of the plurality of operator control devices to lock a differential gear mechanism of the machine and to cause all of a plurality of driven traction devices of the machine connected to the differential gear mechanism to rotate at a substantially uniform speed.

34. The method of claim 29, wherein the implement is a drawbar-circle-moldboard assembly that includes a blade and the method further includes manipulating at least one of the plurality of operator control devices to cause a rotation of the blade about a second axis, substantially orthogonal to the first axis, at a rotation speed related to an engagement position of the at least one of the plurality of operator control devices.

35. The method of claim 34, wherein the blade has a first end and a second end, the method further including tilting one of the first and second levers in a tilting direction and at a tilt angle to cause at least one of the first end and the second end to move in a direction related to the tilting direction and by at a speed corresponding to the tilt angle.

36. The method of claim 29, further including manipulating at least one of the plurality of operator control devices to select an output speed ratio of a transmission of the machine.

37. The method of claim 36, wherein the at least one of the plurality of operator control devices includes a three-position control device and the method further includes manipulating the three-position control device to toggle between a forward, reverse, and neutral condition of the transmission.

38. The method of claim 29, further including manipulating at least one of the plurality of operator control devices to move a throttle to a predetermined throttle position.

39. The method of claim 29, further including manipulating a four-way control device in a first direction to cause a first implement movement and manipulating the four-way control device in a second direction orthogonal to the first direction to cause a second implement movement.

40. The method of claim 39, further including moving the four-way control device in a direction between the first and second directions to simultaneously cause both the first implement movement and the second implement movement.

* * * * *